(12) United States Patent
Okada

(10) Patent No.: US 6,265,967 B1
(45) Date of Patent: Jul. 24, 2001

(54) DISPLAY DEVICE FOR BICYCLE

(75) Inventor: Shigekatsu Okada, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/516,023

(22) Filed: Feb. 29, 2000

(51) Int. Cl.$^7$ ............................................... B62J 3/00
(52) U.S. Cl. ..................... 340/432; 340/688; 74/500.5; 74/501.6; 74/502.2; 74/116; 74/28.1; 74/280; 74/288.4
(58) Field of Search .................... 340/432, 688; 74/500.5, 501.6, 502.2, DIG. 7; 116/28 R, 28.1; 280/288.4

(56) References Cited

U.S. PATENT DOCUMENTS

| | | | |
|---|---|---|---|
| 3,524,979 | 8/1970 | Cohen | 240/2 |
| 3,633,437 | 1/1972 | Ishida | 74/489 |
| 5,052,241 | 10/1991 | Nagano | 74/502.2 |
| 5,325,735 | * 7/1994 | Hagano | 74/502.2 |
| 5,370,412 | 12/1994 | Chou | 280/288.4 |
| 5,903,214 | * 5/1999 | Wtatarai | 340/432 |
| 5,921,139 | 7/1999 | Yamane | 74/473.13 |

FOREIGN PATENT DOCUMENTS

| | | |
|---|---|---|
| 0552775 | 7/1993 | (EP) . |
| 0629860 | 12/1994 | (EP) . |
| 0615896 | 7/1996 | (EP) . |

\* cited by examiner

*Primary Examiner*—Julie Lieu
(74) *Attorney, Agent, or Firm*—Shinjyu Global IP Couselors, LLP

(57) ABSTRACT

A cable operated display device for a bicycle is provided in which the cable can be easily installed or replaced. The cable operated display device includes a mounting portion, a housing, an internal take-up element and a lid. The mounting portion is adapted to be coupled to a portion of a bicycle. The housing is coupled to the mounting portion. The housing has an interior cavity and an open front. The internal take-up element is pivotally coupled within the housing about a first pivot axis. The internal take-up element has a cable attachment portion that is accessible through the open front of the housing without detaching the internal take-up element from the housing. The lid is releasably coupled to the housing to overlie the open front of the housing. The lid has a window to view the movement of an indicator coupled to the internal take-up element.

14 Claims, 18 Drawing Sheets

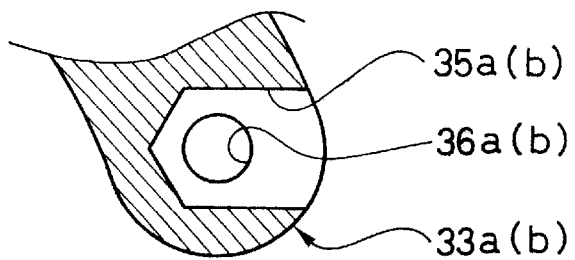
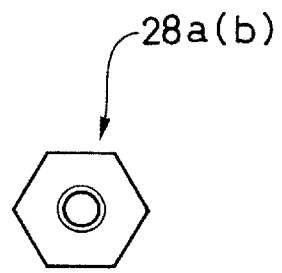
FIG. 14
FIG. 15
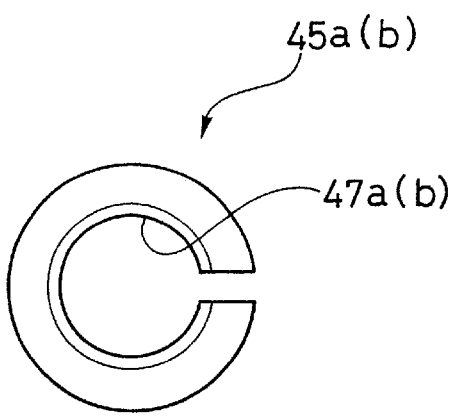
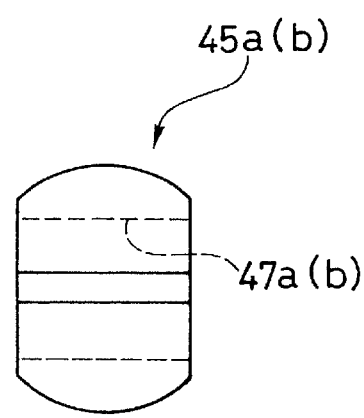
FIG. 16
FIG. 17

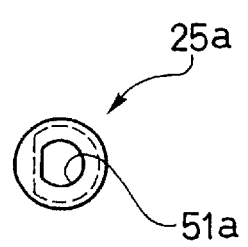
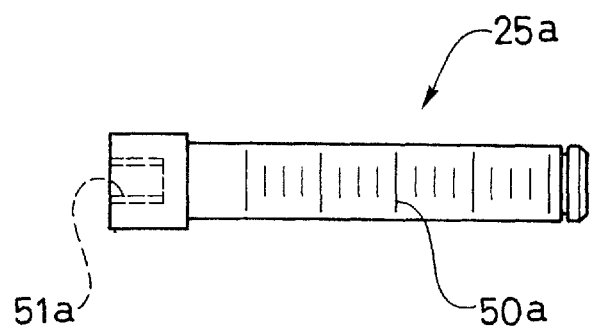
FIG. 18  FIG. 19
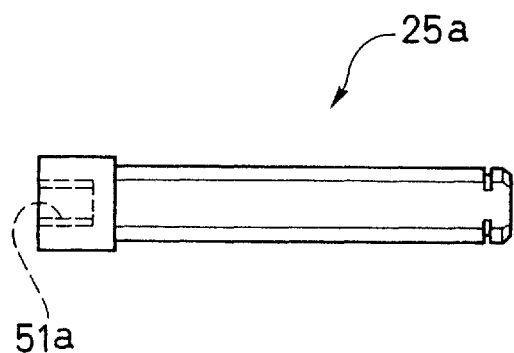
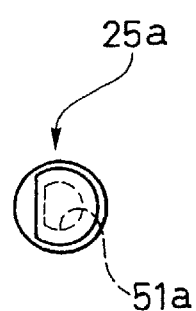
FIG. 20  FIG. 21

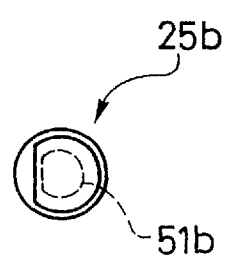
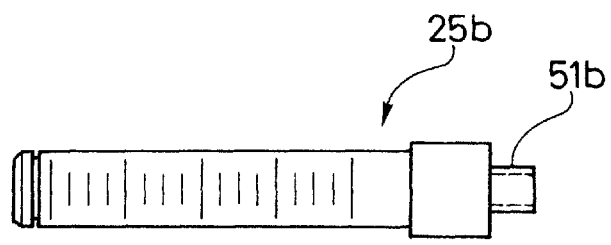
FIG. 22  FIG. 23
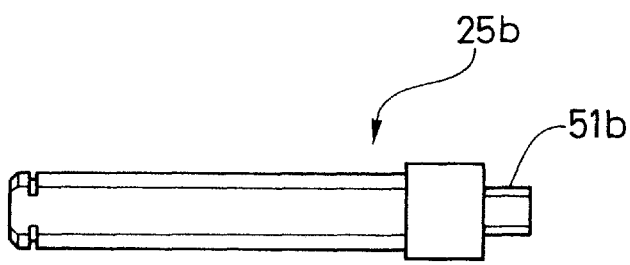
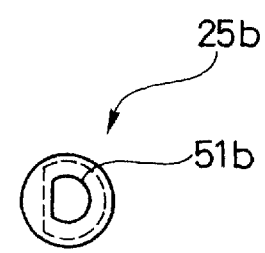
FIG. 24  FIG. 25

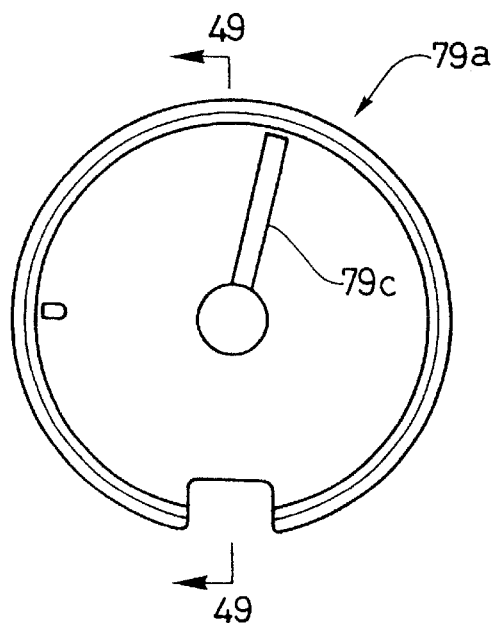
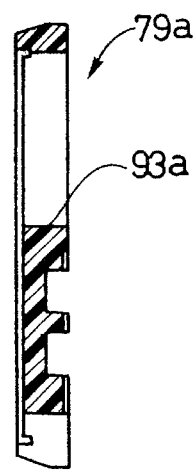
FIG. 48    FIG. 49
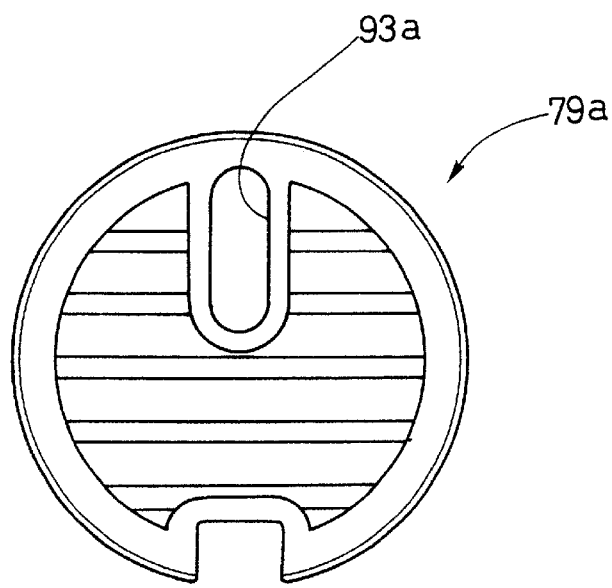
FIG. 50

DISPLAY DEVICE FOR BICYCLE

BACKGROUND OF THE INVENTION

1. Field of the Invention

This invention generally relates to a cable operated display device for a bicycle. More specifically, the present invention relates to the attachment of a cable to a display device for a bicycle.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter and less expensive while maintaining a high level of performance. Moreover, bicycle components are constantly being designed so as to be more ergonomic and user friendly. One particular component of the bicycle that has been extensively redesigned over the past years, are the shifting units of bicycles.

There are many types of shifting units that are currently available on the market. The shifting units range in quality and price. Regardless of the quality and price of the shifting unit, the shifting unit typically will have some sort of display device or gear position indicator. The shifting units are normally located at the ends of the handlebar such that the rider can easily perform a shifting operation without significantly changing the position of the rider's hand. Typically, the gear position indicator or display device is located at the take-up member of the shift operating device that winds up the inner wire of the shift control cable. However, this positioning of the gear position indicator or display device makes it difficult to determine the current gear position. In other words, the rider must look towards the handle portion of the handlebars in order to determine the current gear positions. Accordingly, this is very inconvenient for the rider. Examples of such shifting devices are disclosed in U.S. Pat. Nos. 5,052,241 to Nagano and 5,458,018 to Kawakame.

Accordingly, gear indicators have been developed which are mounted on a center portion of the bicycle so that the rider does not have to take his or her eyes off of the road to determine the current gear position. Examples of gear indicators or displays that are mounted on a center portion of the bicycle are disclosed in U.S. Pat. Nos. 3,524,979 to Cohen and 5,178,033 to Kund. Another example of an indicator that is mounted on a center portion of the bicycle is disclosed in Japanese Utility Model Publication No. 60-23273 which discloses a shifter mounted on the upper horizontal frame tube and in which the indicator is mounted on a center portion of the handlebars. However, these types of gear indicators are often difficult to install and are complicated and expensive.

Another example of a gear indicator that is mounted on the center section of a handlebar is disclosed in European Patent Publication No. 0 629 860 to Shimano Inc. This patent discloses a display panel that is mounted on the center section of the handlebars. While this gear indicator device is very good, it is expensive. Moreover, this indicator can be difficult to install in certain circumstances. Specifically, since both of the shift operating devices are coupled to a single indicator housing, this can make it difficult for the installer. In particular, the installer must first install each of the shift operating devices and then install the indicator on the handlebars. Since there are two cables connected to the gear indicator, it may be difficult to position at the most desirable position.

In view of the above, there exists a need for a mounting device that is adjustable to support the orientation of the bicycle component and that overcomes the above mentioned problems in the prior art. This invention addresses this need in the prior art as well as other needs, which will become apparent to those skilled in the art from this disclosure.

SUMMARY OF THE INVENTION

One object of the present invention is to provide a display device that is easy to attach the indicator cable thereto.

Another object of the present invention is to provide a display device, which is lightweight in design.

Another object of the present invention is to provide a display device, which can be relatively easy to manufacture by conventional manufacturing techniques.

Yet still another object of the present invention is to provide a display device, which is relatively inexpensive to manufacture.

The above objects can also be fulfilled, according to the present invention, by providing a mounting device adapted to be coupled to a portion of a bicycle to support at least one bicycle component thereon. A cable operated display device for a bicycle is provided in which the cable can be easily installed or replaced. The cable operated display device includes a mounting portion, a housing, an internal take-up element and a lid. The mounting portion is adapted to be coupled to a portion of a bicycle. The housing is coupled to the mounting portion. The housing has an interior cavity and an open front. The internal take-up element is pivotally coupled within the housing about a first pivot axis. The internal take-up element has a cable attachment portion that is accessible through the open front of the housing without detaching the internal take-up element from the housing. The lid is releasably coupled to the housing to overlie the open front of the housing. The lid has a window to view the movement of an indicator coupled to the internal take-up element.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 14 is a partial cross sectional view of a portion of one of the bar clamps of the mounting device illustrated in FIGS. 2–5;

FIG. 15 a plan view of one of the nuts of the threaded fastener for the one of the bar clamps of the mounting device illustrated in FIGS. 2–5;

FIG. 16 is a side elevational view of one of the ball joints that is used in the bar clamps of the mounting device illustrated in FIGS. 2–5;

FIG. 17 is a plan view of the ball joint illustrated in FIG. 16 for use with the bar clamps of the mounting device illustrated in FIGS. 2–5;

FIG. 18 is an inner end elevational view of the right rod section of the support member for the mounting device illustrated in FIGS. 2–5;

FIG. 19 is a front side elevational view of the right rod section of the support member for the mounting device illustrated in FIGS. 2–5;

FIG. 20 is a rear side elevational view of the right rod section of the support member for the mounting device illustrated in FIGS. 2–5;

FIG. 21 an outer end elevational view of the right rod section of the support member for the mounting device illustrated in FIGS. 2–5;

FIG. 22 a front side elevational view of the left rod section of the support member for the mounting device illustrated in FIGS. 2–5;

FIG. 23 an inner end elevational view of the left rod section of the support member for the mounting device illustrated in FIGS. 2–5;

FIG. 24 an outer end elevational view of the left rod section of the support member for the mounting device illustrated in FIGS. 2–5;

FIG. 25 is a rear side elevational view of the right rod section of the support member for the mounting device illustrated in FIGS. 2–5;

FIG. 48 is a front elevational view of the indicator plate with the indicating indicia added thereto;

FIG. 49 is a cross-sectional view of the indicator plate with indicia as seen along section line 49—49 of FIG. 48; and FIG. 50 is a rear elevational view of the indicator plate illustrated in FIGS. 48 and 49.

DETAILED DESCRIPTION OF THE PREFERRED EMBODIMENTS

Figure 1:
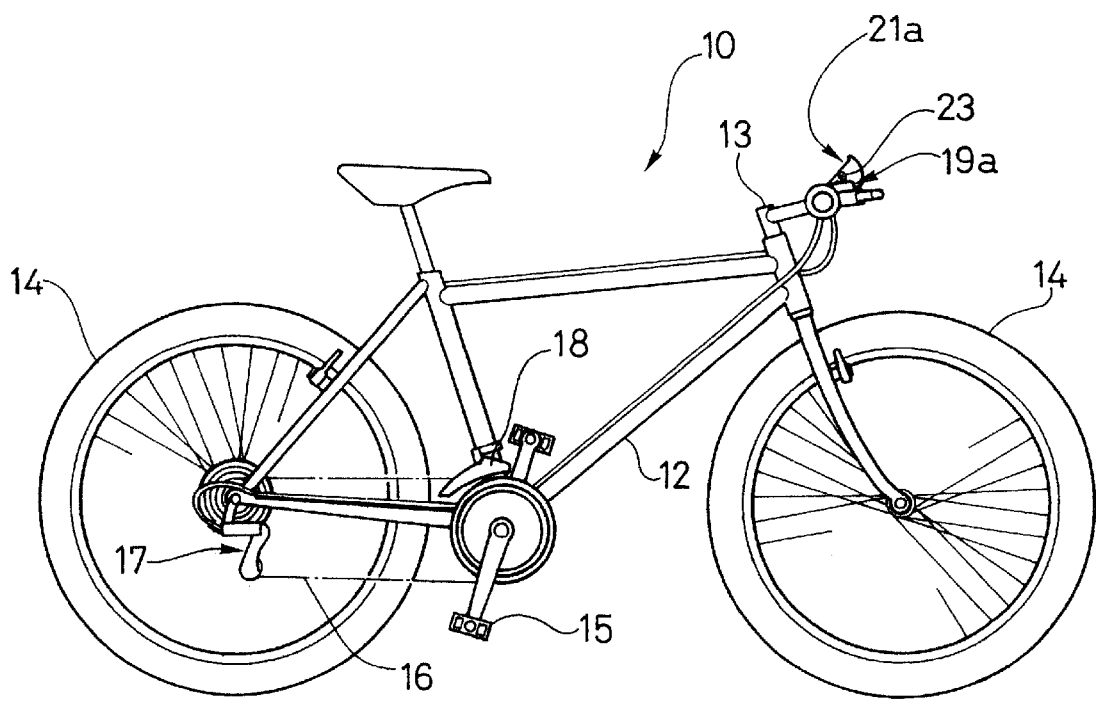
FIG. 1 is a side elevational view of a conventional bicycle equipped with a mounting device and gear indicators for shifting units in accordance with one embodiment of the present invention.
Figure 2:
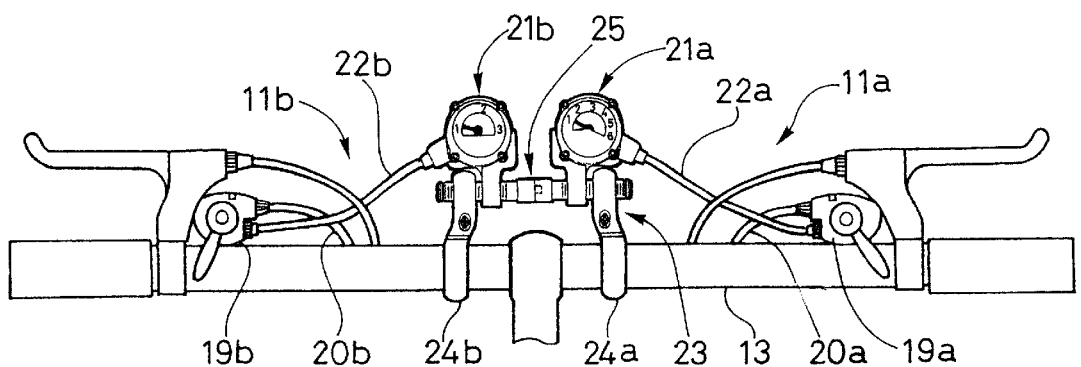
FIG. 2 is a partial top plan view of the handlebar of the conventional bicycle equipped with the mounting device and gear indicators for shifting units in accordance with one embodiment of the present invention.

Referring initially to FIGS. 1 and 2, a conventional bicycle 10 is illustrated with a pair of shifting units 11a and 11b coupled thereto in accordance with a first embodiment of the present invention. Bicycle 10 is a typical bicycle that includes a frame 12, a handlebar 13, a pair of wheels 14, a pair of pedals 15 for driving a chain 16, a rear derailleur 17 that guides chain 16 laterally along a plurality of rear sprockets mounted to rear wheel 14 and a front derailleur 18 that guides chain 16 laterally along a plurality of front sprockets mounted to the bottom bracket (not shown).

Bicycle 10 and its various components, except for shifting units 11a and 11b, are well known in the prior art. Thus, bicycle 10 and its various components will not be discussed or illustrated in detail herein, except for the components that relate to the present invention. In other words, only shifting units 11a and 11b and the components that relate thereto will be discussed and/or illustrated herein.

Shifting units 11a and 11b are fixedly coupled to handlebar 13 of bicycle 10 and operatively coupled to rear derailleur 17 and front derailleur 18, respectively. Each of these shifting units 11a and 11b are substantially identical to each other, except that shifting unit 11a is coupled to rear derailleur 17 which has six gear shifting positions, and shifting unit 11b is operatively coupled to front derailleur 18 which has only three gear shifting positions. Of course, it will be apparent to those skilled in the art that shifting units 11a and 11b can have any number of gear shifting positions. The number of gear shifting positions or stages will depend upon the number of gears or sprockets used in the bicycle's transmission. In other words, while shifting units 11a and 11b are illustrated as a six-stage shifting unit and a three-stage shifting unit, respectively, it will be apparent to those skilled in the art from this disclosure that shifting units 11a and 11b can be constructed with additional stages or fewer stages as needed and/or desired.

As used herein, the terms "forward, rearward, upward, above, downward, below and transverse" refer to those directions of a bicycle in its normal riding position. Accordingly, these terms as utilized to describe shifting units 11a and 11b in the claims, should be interpreted relative to bicycle 10 in its normal riding position.

Shifting unit 11a basically includes a first shift operating device 19a operatively coupled to rear derailleur 17 via first shift cable 20a, and a first gear indicator 21a operatively coupled to first shift operating device 19a by a first indicator cable 22a. Similarly, shifting unit 11b basically includes a second shift operating device 19b operatively coupled to front derailleur 18 via second shift cable 20b, and a second gear indicator 21b operatively coupled to second shift operating device 19b by a second indicator cable 22b. Gear indicators 21a and 21b are adjustably mounted on handlebar 13 by a mounting device 23.

Basically, shift operating devices 19a and 19b are substantially identical to each other, except that they are mirror images and have different numbers of gear shifting stages. Preferably, first shift operating device 19a has six shifting stages, while second shift operating device 19b has three shifting stages. Since shift operating devices 19a and 19b are well known in the bicycle art and their particular constructions are not important to the present invention, shift operating devices 19a and 19b will not be discussed or illustrated in detail herein. As known in the art, each of the shift operating devices 19a and 19b has a take-up member (not shown). The take-up member of first shift operating device 19a is coupled to rear derailleur 17 via first shift cable 20a and to first gear indicator 21a by first indicator cable 22a. Similarly, the take-up member of second shift operating device 19b is coupled to the front derailleur 18 via second shift cable 20b and to second gear indicator 21b by second indicator cable 22b.

When a rider pushes the shift lever of either shift operating device 19a or 19b, this movement of the shift lever causes the corresponding take-up member to pivot about a rotational axis together with the shift lever. This movement of the shift lever also causes first or second shift cable 20a or 20b to be pulled and/or released so as to shift derailleur 17 or 18. Movement of the shift lever also causes indicator cable 22a or 22b to be released or pulled so that gear indicator 21a or 21b displays the current gear position of chain 16.

Similarly, first gear indicator 21a is substantially identical to second gear indicator 21b, except that they are substantial mirror images and have different numbers of shifting stages. The shifting stages of gear indicators 21a and 21b correspond to the number of shifting stages in shift operating devices 19a and 19b, respectively. In other words, since first shift operating device 19a has six shift stages, first gear indicator 21a has six gear indicating positions. Likewise, since second shift operating device 19b has three shifting stage positions, second gear indicator 21b also has three gear indicating positions.

As seen in FIGS. 2–5, mounting device 23 is illustrated for adjustably supporting first and second gear indicators 21a and 21b. Mounting device 23 is designed to allow shift operating devices 19a and 19b to be installed onto the outer ends of handlebars 13 and gear indicators 21a and 21b to be installed on the center section of handlebars 13. Moreover, mounting device 23 is designed to accommodate various handlebars. Mounting device 23 adjustably supports gear indicators 21a and 21b such that gear indicators 21a and 21b can move in a direction that is substantially perpendicular to the vertical center plane of the bicycle. More specifically, mounting device 23 is designed to be mounted adjacent to the center of handlebar 13 with gear indicators 21a and 21b being slidably coupled thereto for movement generally along the longitudinal axis of handlebar 13.

Mounting device 23 basically includes a pair of bar clamps 24a and 24b with a support member 25 adjustably coupled between bar clamps 24a and 24b. Gear indicators 21a and 21b are adjustably mounted on support member 25. Bar clamps 24a and 24b are substantially identical to each other, except that first bar clamp 24a is a mirror image of second bar clamp 24b.

Each of the bar clamps 24a and 24b has a fastener 26a or 26b for fixedly securing bar clamps 24a and 24b to handlebar 13 of the bicycle and to support member 25. These fasteners 26a and 26b are preferably formed of a bolt 27a or 27b and a nut 28a or 28b. Except for fasteners 26a and 26b, bar clamps 24a and 24b are preferably integrally formed as a one-piece, unitary member. Bar clamps 24a and 24b can be constructed of any suitable material that can be used to carry out the present invention. Preferably, a lightweight material is utilized, such as plastic, or a lightweight metallic material.

Referring to FIGS. 6–9, the right bar clamp 24a has a bar clamping portion 29a for attaching to handlebar 13, and a support portion 30a for adjustably supporting the support member 25. Bar clamping portion 29a has a split ring section 31a with one end of split ring section 31a coupled to support portion 30a by a connecting section 32a and the other end of split ring section 31a coupled to a free end section 33a. Split ring section 31a defines a mounting bore or hole 34a that is sized to receive a portion of handlebar 13 therein.

Fastener 26a compresses connecting section 32a and free end section 33a towards each to adjust the size or diameter of mounting bore 34a of split ring section 31a to securely clamp handlebar 13 therein. In particular, connecting section 32a has a hole 37a that receives bolt 27a therethrough and free end section 33a has a slot 35a with nut 28a retained therein and a hole 36a that receives bolt 27a therethrough. More specifically, nut 28a is frictionally retained in slot 35a of free end section 33a. Nut 28a is positioned to be coaxially located with hole 36a, such that bolt 27a can be threadedly coupled thereto. When the sections 32a and 33a are compressed towards each other by the fastener 26a , the size or diameter of mounting bore 34a of split ring section 31a is adjusted to securely clamp the handlebar 13.

Support portion 30a also has a split ring section 41a with one end interconnected with bar clamping portion 29a by connecting section 32a and the other end of split ring section 41a having to a free end section 43a. Split ring section 41a defines a mounting bore or hole 44a with a ball joint 45a located therein. More specifically, mounting bore 44a of support portion 30a has a partial spherical surface 46a that allows ball joint 45a to rotate angularly therein. Preferably, ball joint 45a is a split ring with a mounting bore 47a formed therein. Mounting bore 47a is sized to slidably receive support member 25 therein. When support member 25 is located within mounting bore 47a of ball joint 45a, the ball joint 45a preferably can move at least approximately twenty-five degrees from a center point where support member 25 has its longitudinal axis coincident with the longitudinal axis of mounting bore 44a of the support portion 30a.

The free end section 43a of support portion 30a has a hole 48a for receiving bolt 27a of the fastener 26a therethrough. This hole 48a is aligned with hole 37a of connecting section 32a and hole 36a of free end section 33a. Accordingly, a single fastener is utilized to secure the bar clamp 24a to both handlebar 13 and support member 25. Of course, in a less preferred embodiment, additional fasteners could be utilized. Moreover, the bar clamping portion 29a and the support portion 30a could be constructed of several individual pieces.

Referring to FIGS. 10–13, the left bar clamp 24b has a bar clamping portion 29b for attaching to handlebar 13, and a support portion 30b for adjustably supporting support member 25. Bar clamping portion 29b has a split ring section 31b with one end of split ring section 31b coupled to support portion 30b by connecting section 32b and the other end of split ring section 31b coupled to a free end section 33b. Split ring section 31b defines a mounting bore or hole 34b that is sized to receive a portion of handlebar 13 therein.

Fastener 26b compresses connecting section 32b and free end section 33b towards each to adjust the size or diameter of mounting bore 34b of split ring section 31b to securely clamp handlebar 13 therein. In particular, connecting section 32b has a hole 37b that receives bolt 27b therethrough and free end section 33b has a slot 35b with nut 28b retained therein and a hole 36b that receives bolt 27b therethrough. More specifically, nut 28b is frictionally retained in slot 35b of free end section 33b. Nut 28b is positioned to be coaxially located with hole 36b, such that bolt 27b can be threadedly coupled thereto. When the sections 32b and 33b are compressed towards each other by the fastener 26b, the size or diameter of mounting bore 34b of split ring section 31b is adjusted to securely clamp the handlebar 13.

Support portion 30b also has a split ring section 41b with one end interconnected with bar clamping portion 29b by connecting section 32b and the other end of split ring section 41b having to a free end section 43b. Split ring section 41b defines a mounting bore or hole 44b with a ball joint 45b located therein. More specifically, mounting bore 44b of support portion 30b has a partial spherical surface 46b that allows ball joint 45b to rotate angularly therein. Preferably, ball joint 45b is a split ring with a mounting bore 47b formed therein. Mounting bore 47b is sized to slidably receive support member 25 therein. When support member 25 is located within mounting bore 47b of ball joint 45b, the ball joint 45b preferably can move at least approximately twenty-five degrees from a center point where support member 25 has its longitudinal axis coincident with the longitudinal axis of mounting bore 44b of the support portion 30b.

The free end section 43b of support portion 30b has a hole 48b for receiving bolt 27b of the fastener 26b therethrough. This hole 48b is aligned with hole 37b of connecting section 32b and hole 36b of free end section 33b. Accordingly, a single fastener is utilized to secure the bar clamp 24b to both handlebar 13 and support member 25. Of course, in a less preferred embodiment, additional fasteners could be utilized. Moreover, bar clamping portion 29b and support portion 30b could be constructed of several individual pieces.

A rubber shim (not shown) can be placed within the mounting bores 34a and 34b of the bar clamping portions 29a and 29b to reduce the size of the mounting bores 34a and 34b of the bar clamping portions 29a and 29b to accommodate smaller diameter handlebar 13.

Referring to FIGS. 2–5 and 18–25, support member 25 is preferably an elongated rod having a pair of rod sections 25a and 25b coupled together at their inner ends via a friction fit coupling. Accordingly, support member 25 allows the first and second bar clamps 24a and 24b to be utilized together as a single unit or to be separated and mounted at two spaced locations. Moreover, it will be apparent to those skilled in the art from this disclosure that additional rod sections could be added between these two rod sections 25a and 25b that are illustrated so as to lengthen the overall length of support member 25.

Preferably, each of these rod sections 25a and 25b is constructed of a lightweight material, such as plastic or a lightweight metallic material. Preferably, each of the rod sections 25a and 25b has a non-circular cross-section so that when gear indicators 21a and 21b are mounted thereon, no rotation exists between gear indicators 21a and 21b and support member 25. More specifically, rod sections 25a and 25b preferably have a partial curved cross-section with a flat side so as to be adjustable within ball joints 45a and 45b. A scale or positioning marks 50a and 50b are preferably formed along the longitudinal length of each of the rod sections 25a and 25b, so that gear indicators 21a and 21b can be precisely positioned in desired locations along support member 25 by the rider.

Preferably, each of the outer ends of rod sections 25a and 25b are provided with an annular recess for receiving an optional retaining clip (not shown) to prevent rod sections 25a and 25b from being accidentally uncoupled from bar clamps 24a and 24b. The inner ends of the rod sections 25a and 25b preferably have enlarged widths with the end surfaces having either a recess 51a or a protrusion 51b that mates with the adjoining rod section that has a corresponding recess 51a or protrusion 51b. In this embodiment, first or right rod section 25a has a recess 51a, while second or left rod section 25b has a protrusion 51b. Preferably, recess 51a and protrusion 51b are non-circular in cross-section to prevent relative rotation between rod sections 25a and 25b. Additionally, recess 51a and protrusion 51b preferably frictionally engage each other to prevent separation of rod sections 25a and 25b from each other.

Turning again to FIGS. 2–5, the overall structures of gear indicators 21a and 21b are illustrated. First or right gear indicator 21a is substantially identical to second or left gear indicator 21b, except that they are substantial mirror images and have different numbers of shifting stages. The shifting stages of gear indicators 21a and 21b correspond to the number of shifting stages in shift operating devices 19a and 19b, respectively. In other words, since first shift operating device 19a has six shift stages, first gear indicator 21a has six gear indicating positions. Likewise, since second shift operating device 19b has three shifting stage positions, second gear indicator 21b also has three gear indicating positions. In view of the similarities between gear indicators 21a and 21b, it will be apparent to those skilled in the art from this disclosure that the construction and operation of second gear indicator 21b can be obtained from the description of first gear indicator 21a. Therefore, only first gear indicator 21a will be discussed or illustrated in detail herein.

Referring now to FIGS. 26–50, the details of gear indicator or display device 21a is illustrated in accordance with the present invention. The gear indicator 21a is constructed in such a manner that indicator wire or cable 22a can be easily installed or replaced in a simple manner. Gear indicator 21a basically includes a housing 60a with a mounting portion 61a, a lid 62a detachably coupled to housing 60a and an internal indicator mechanism 63a. As explained below, most of the parts of gear indicator 21a can be constructed of a lightweight plastic material. Of course, other types of suitable materials can also be utilized, such as lightweight metallic materials.

Figure 3:
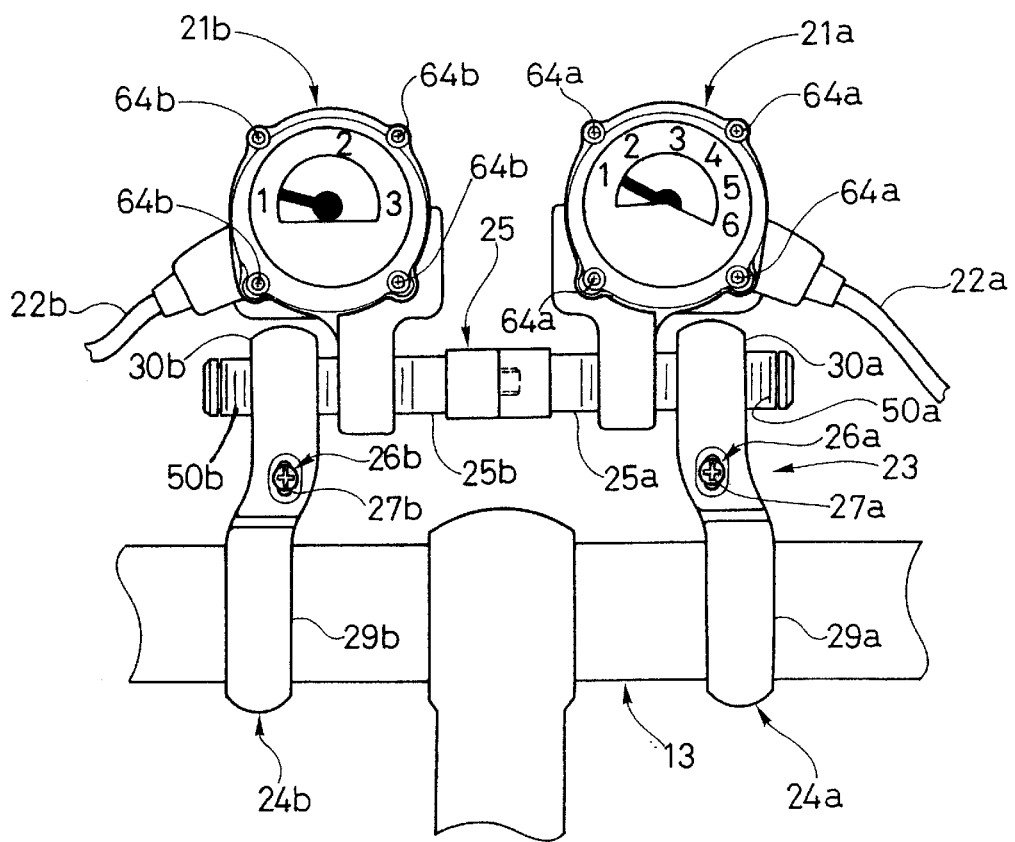
FIG. 3 is an enlarged, partial top plan view of the handlebar of the conventional bicycle equipped with the mounting device and gear indicators illustrated in FIG. 2.
Figure 4:
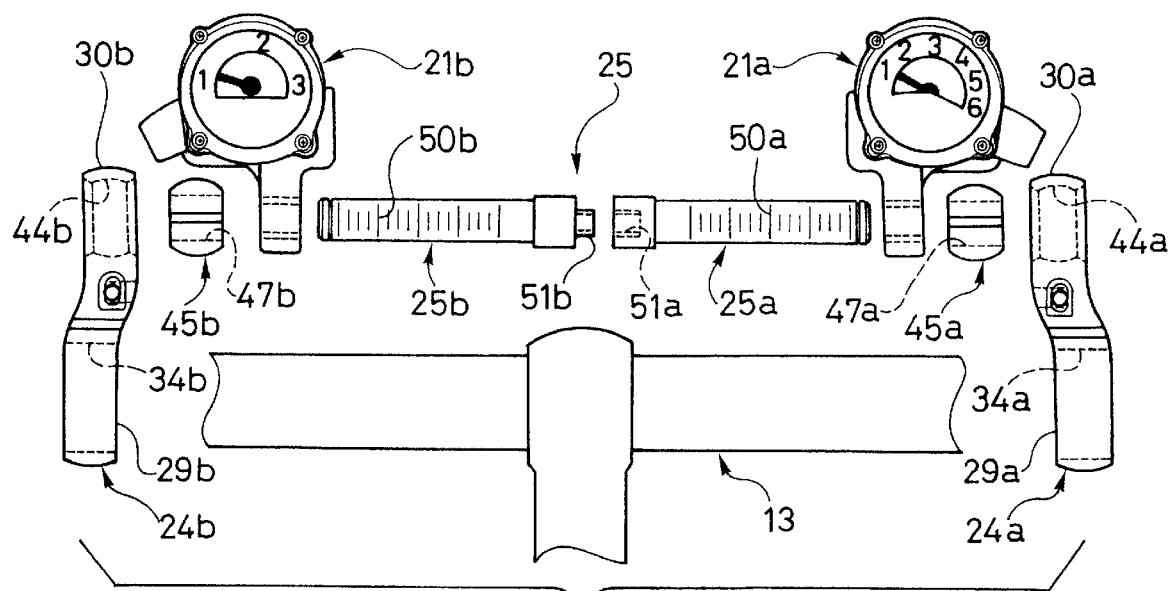
FIG. 4 is an exploded partial top plan view of the handlebar of the conventional bicycle equipped with the mounting device and gear indicators illustrated in FIGS. 2 and 3.
Figure 5:
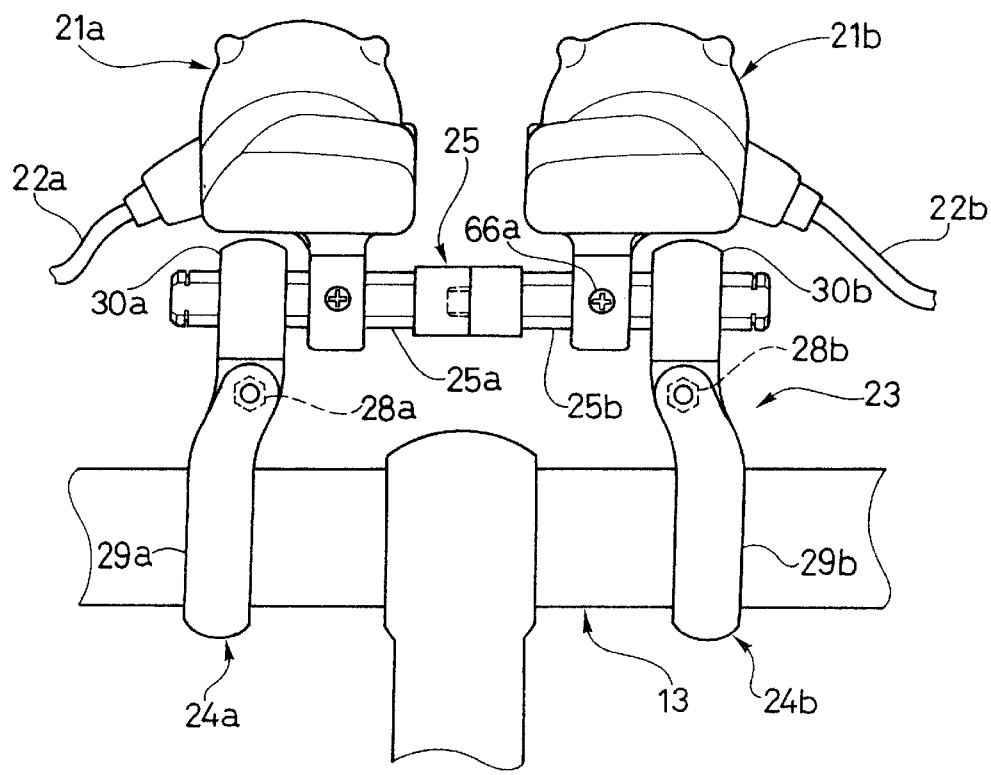
FIG. 5 is a partial bottom plan view of the handlebar of the conventional bicycle equipped with the mounting device and gear indicators illustrated in FIGS. 2–4.
Figure 6:
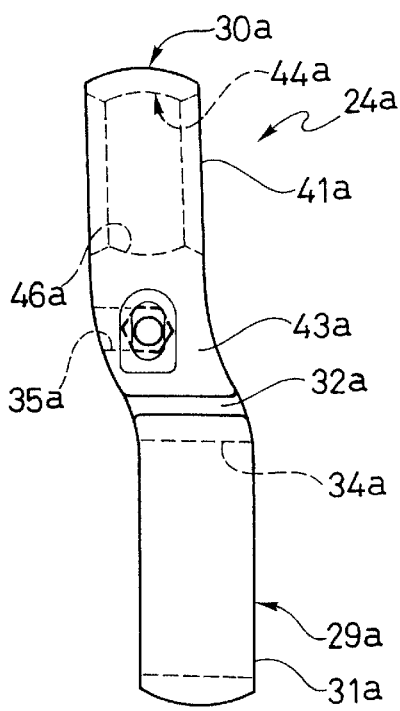
FIG. 6 is a top plan view of the right bar clamp for the mounting device illustrated in FIGS. 2–5.
Figure 8:
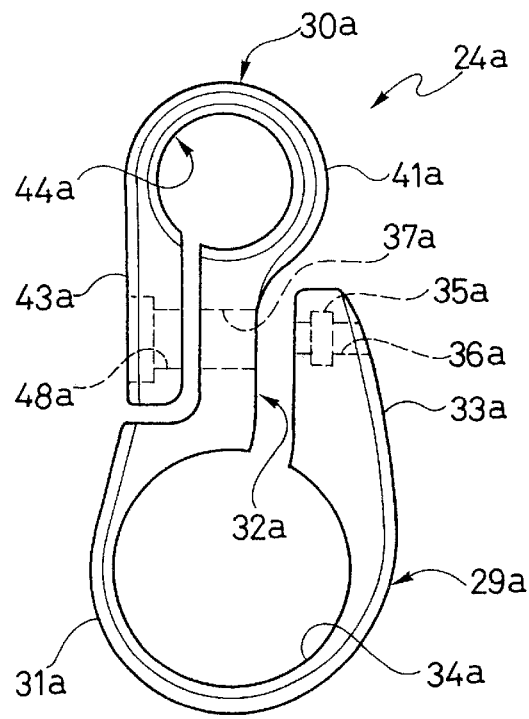
FIG. 8 is an outside elevational view of the right bar clamp for the mounting device illustrated in FIGS. 6 and 7.
Figure 7:
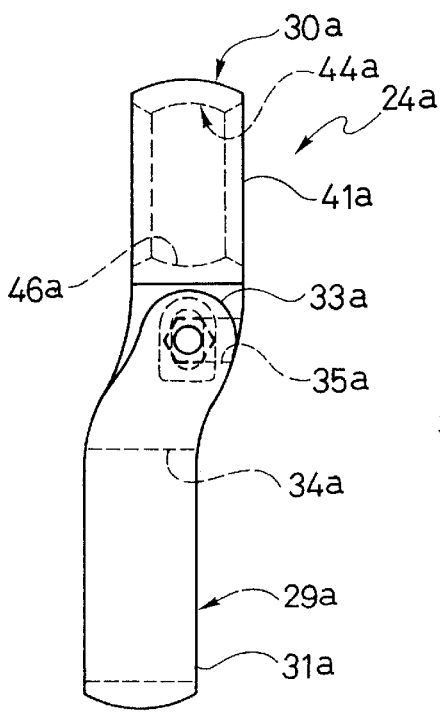
FIG. 7 is a bottom plan view of the right bar clamp for the mounting device illustrated in FIG. 6.
Figure 9:
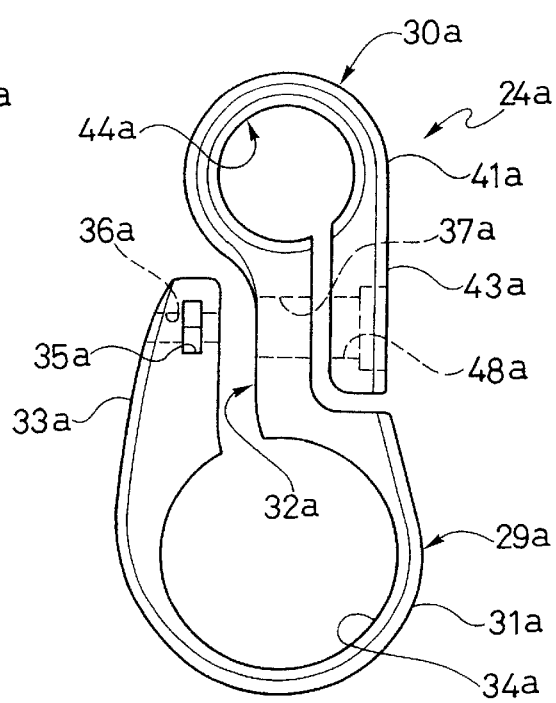
FIG. 9 is an inside elevational view of the right bar clamp for the mounting device illustrated in FIGS. 6–8.
Figure 10:
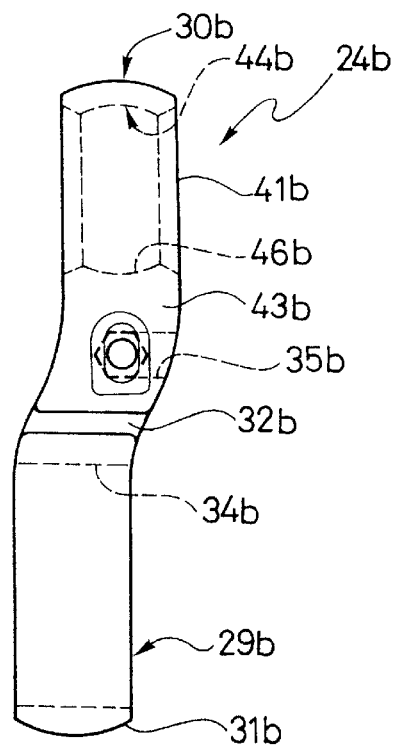
FIG. 10 is a top plan view of the left bar clamp for the mounting device illustrated in FIGS. 2–5.
Figure 12:
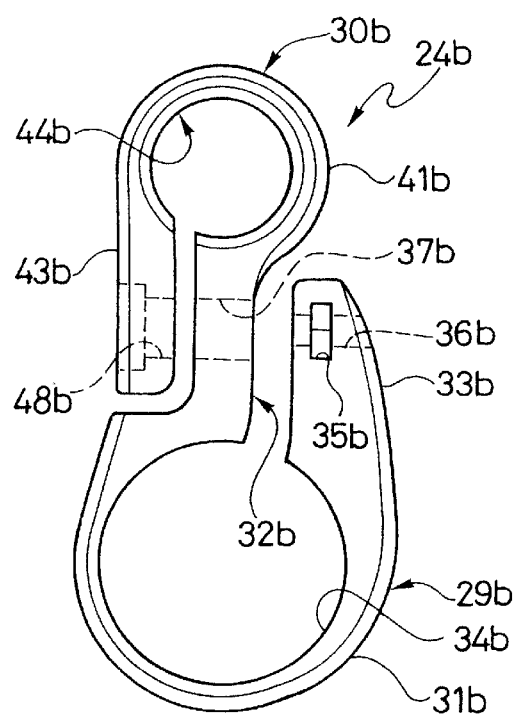
FIG. 12 is an inside elevational view of the left bar clamp for the mounting device illustrated in FIGS. 10 and 11.
Figure 11:
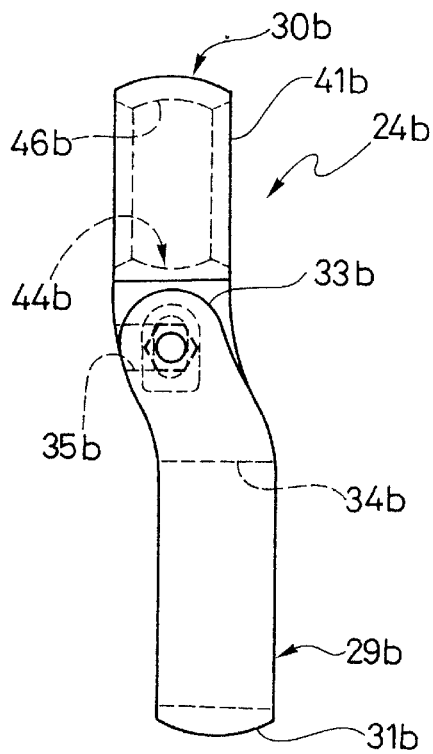
FIG. 11 is a bottom plan view of the left bar clamp for the mounting device illustrated in FIG. 10.
Figure 13:
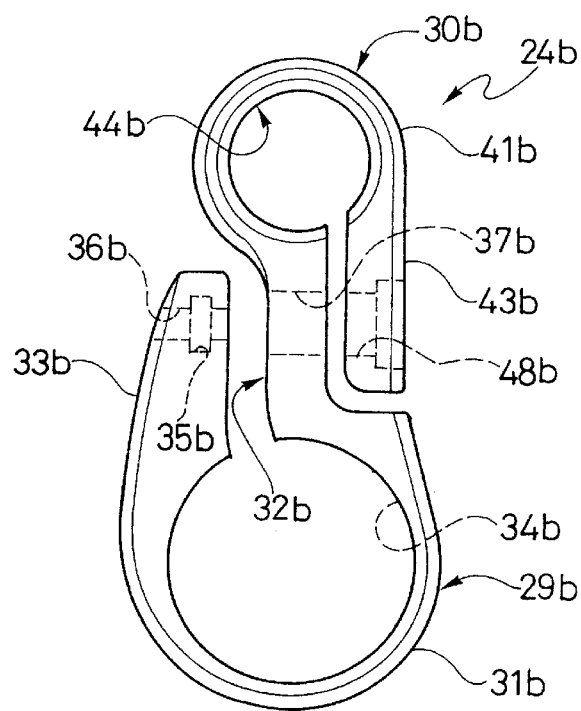
FIG. 13 is an outside elevational view of the left bar clamp for the mounting device illustrated in FIGS. 10–12.

Preferably, lid 62a is releasably coupled to housing 60a by four fasteners or screws 64a (FIG. 3). Once lid 62a is removed, indicator wire or cable 22a can be easily installed or replaced without having to remove any additional fasteners.

Referring now to FIGS. 27–30, housing 60a and mounting portion 61a are preferably integrally formed together as a one-piece, unitary member. Housing 60a and mounting portion 61a can be constructed of a lightweight plastic material. Of course, other types of suitable materials can also be utilized, such as lightweight metallic materials.

Mounting portion 61a preferably has a non-circular hole 64a that matches the non-circular cross-section of rod section 25a of support member 25 to slidably receive rod section 25a therein, but to prevent rotation therebetween. Mounting portion 61a also has a transverse threaded hole 65a with a set screw 66a to lock gear indicator 21a at a selected position along support member 25. Alternatively, mounting portion 61a can be a clamp with a split ring section similar in construction to the support portion of the bar clamp discussed above.

Housing 60a has a cavity 67a for receiving internal indicator mechanism 63a therein, a front access opening 68a for accessing indicator mechanism 63a an indicator cable opening 69a in the side wall of housing 60a for receiving indicator cable 22a therethrough. Housing 60a has four holes for receiving lid mounting screws 64a. Thus, front opening 68a is closed by lid 62a.

Cavity 67a of housing 60a has a step-shaped pivot shaft 70a with a threaded bore 71a and a discontinuous annular sleeve 72a that is coaxially mounted around pivot shaft 70a. Pivot shaft 70a and sleeve 72a rotatably support a portion of indicator mechanism 63a as explained below. Pivot shaft 70a has a first pivot axis A that is offset from the center or second pivot axis B of front access opening 68a so that indicator mechanism 63a can properly indicate the correct gear position, as explained below.

Preferably, the indicator cable opening 69a has its center longitudinal axis tangentially located relative to an imaginary circle positioned around the center axis A of pivot shaft 70a.

Referring now to FIGS. 34–39, lid 62a is preferably constructed of a molding portion or cover 73a (FIGS. 34 and 35) and a transparent portion or lens 74a (FIGS. 36–39). Cover 73a and lens 74a can be constructed of a lightweight plastic material. Of course, other types of suitable materials can also be utilized, such as lightweight metallic materials. Cover 73a is coupled to housing 60a by lid mounting screws 64a. Cover 73a has an opening or window 75a for viewing into the interior of housing 60a.

Figure 26:
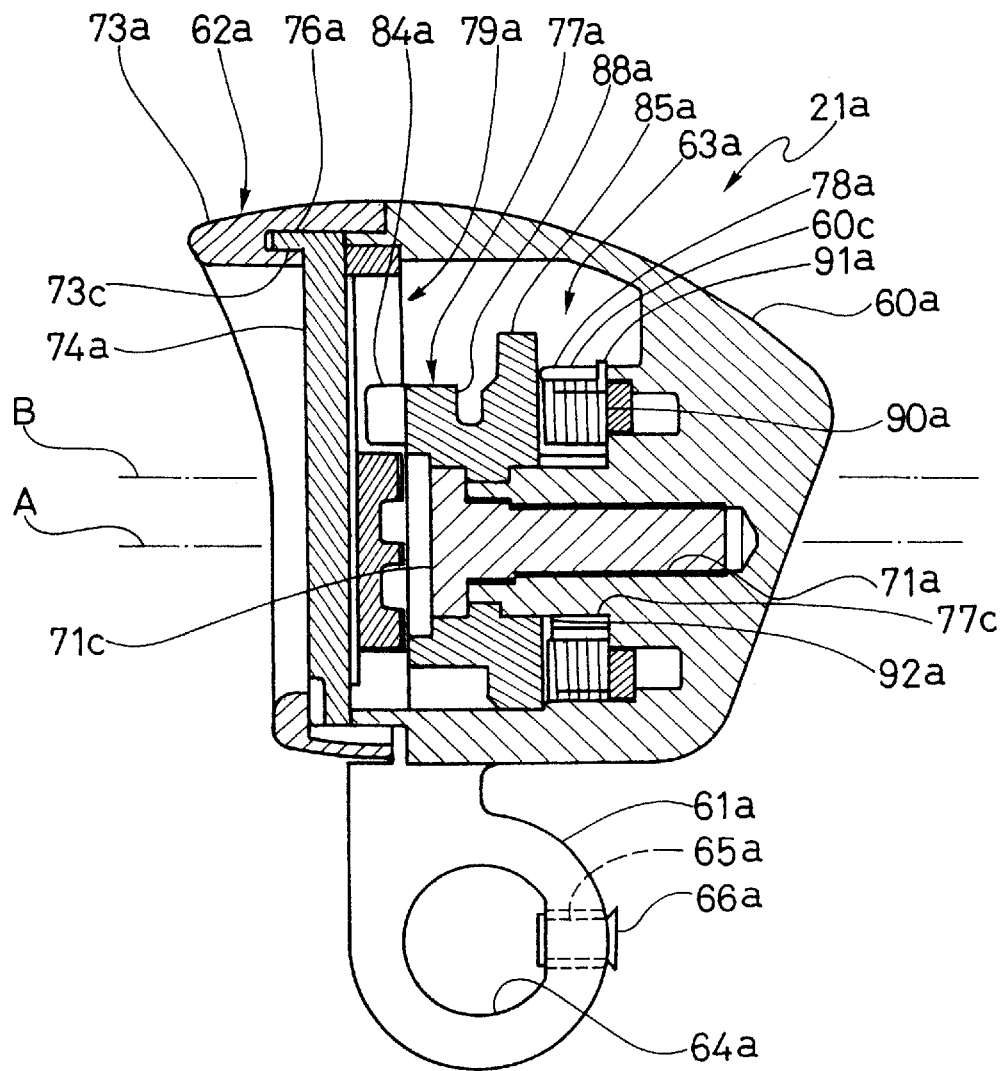
FIG. 26 is a cross sectional view of the right gear indicator in accordance with the present invention.
Figure 27:
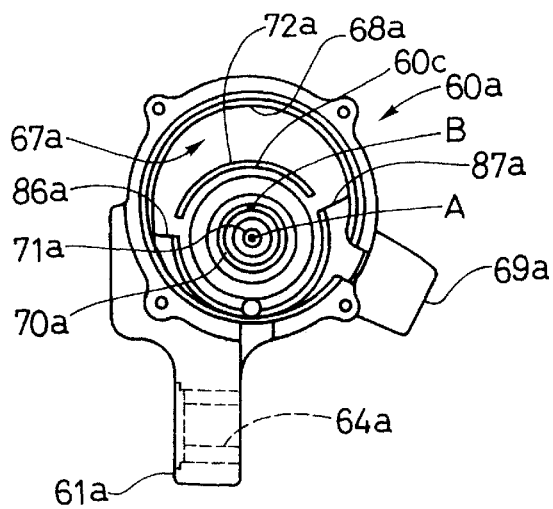
FIG. 27 is a front elevational view of the housing for the right gear indicator illustrated in FIGS. 2–5 and 26.
Figure 28:
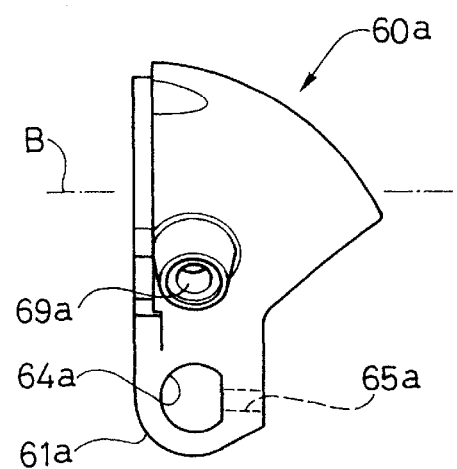
FIG. 28 is a right side elevational view of the housing illustrated in FIG. 27 for the right gear indicator.
Figure 29:
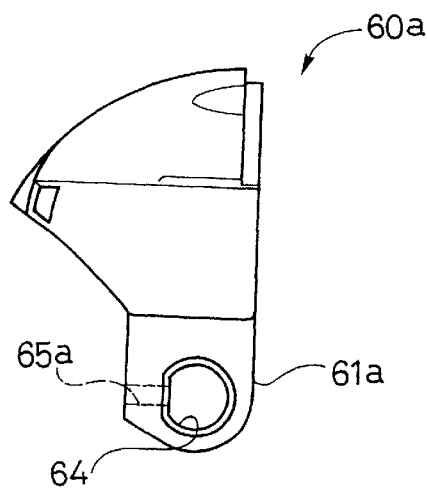
FIG. 29 is a left side elevational view of the housing illustrated in FIGS. 27 and 28 for the right gear indicator.
Figure 30:
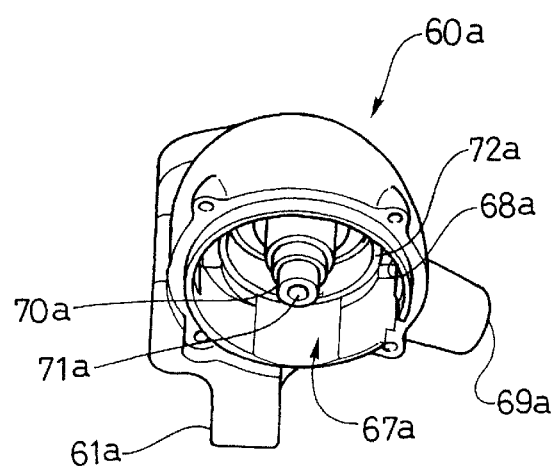
FIG. 30 is a top perspective view of the housing illustrated in FIGS. 27–29 for the right gear indicator.
Figure 31:
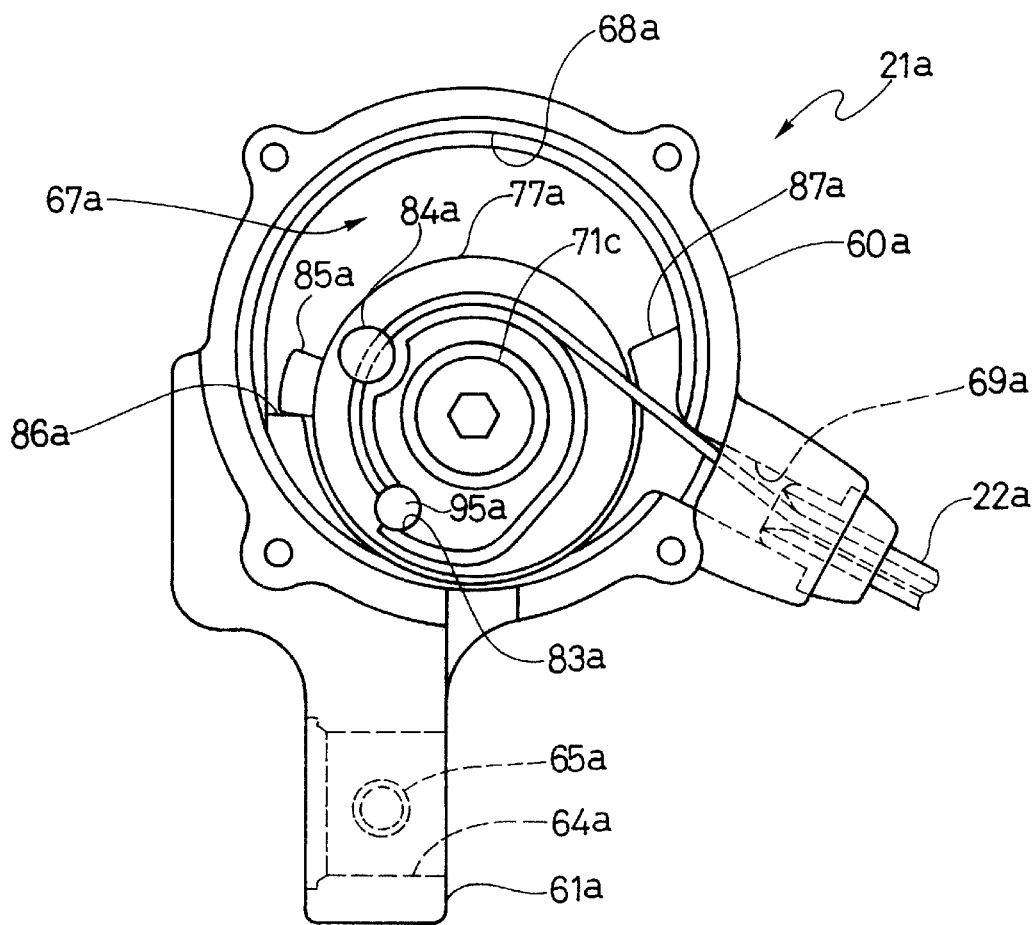
FIG. 31 is a front elevational view of the right gear indicator with the lid and indicator plate removed to show the internal take-up element in its end position, prior to rotation.
Figure 32:
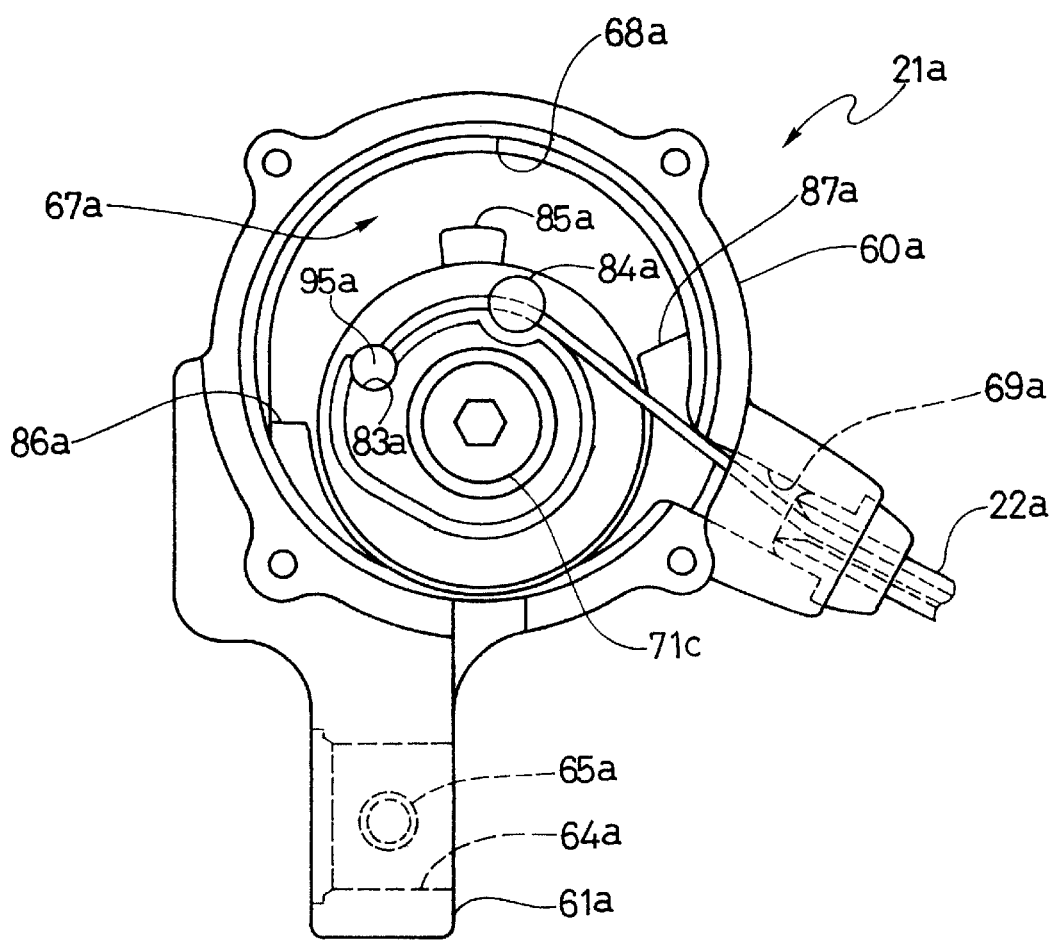
FIG. 32 is a front elevational view of the right gear indicator with the lid and indicator plate removed to show the internal take-up element rotated to an intermediate position by the indicator cable.
Figure 33:
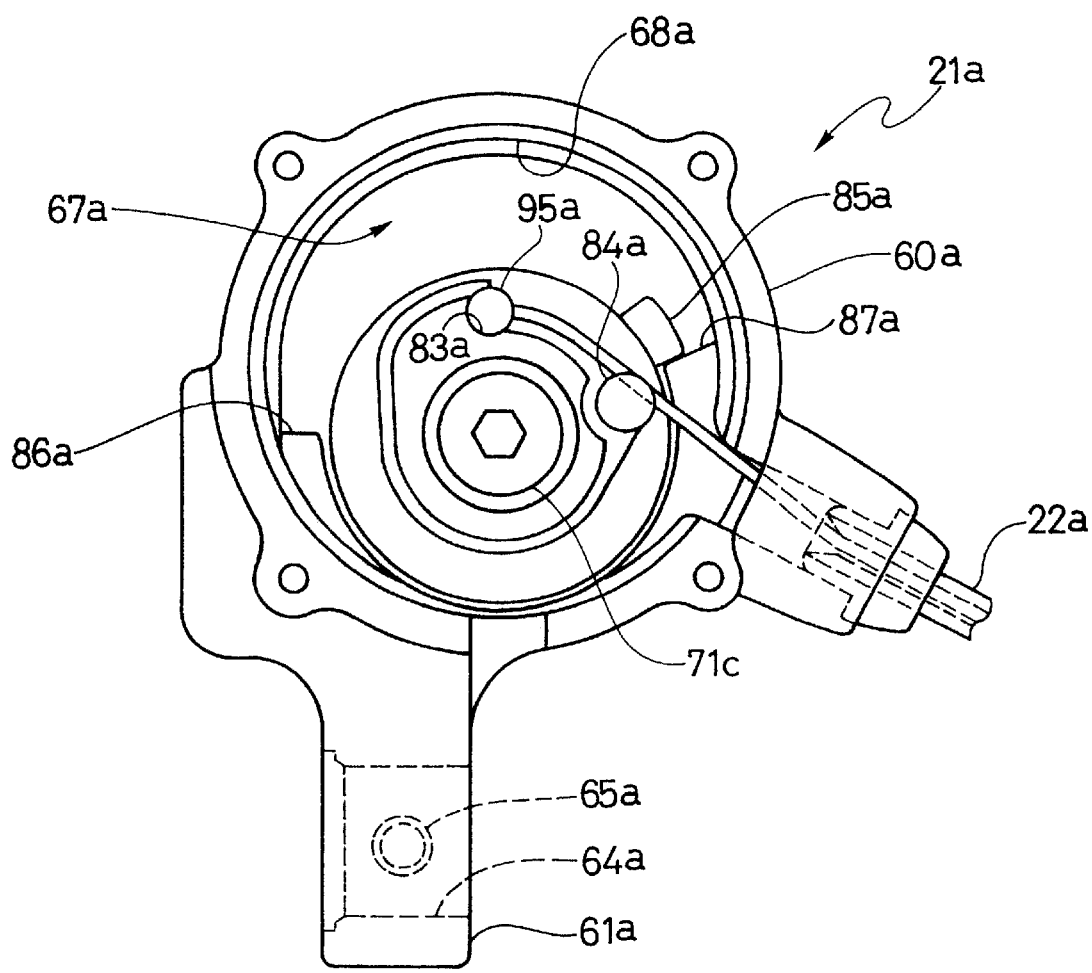
FIG. 33 is a front elevational view of the right indicator with the lid and the indicator plate removed to show the internal take-up element rotated to its end position by the indicator cable.
Figure 34:
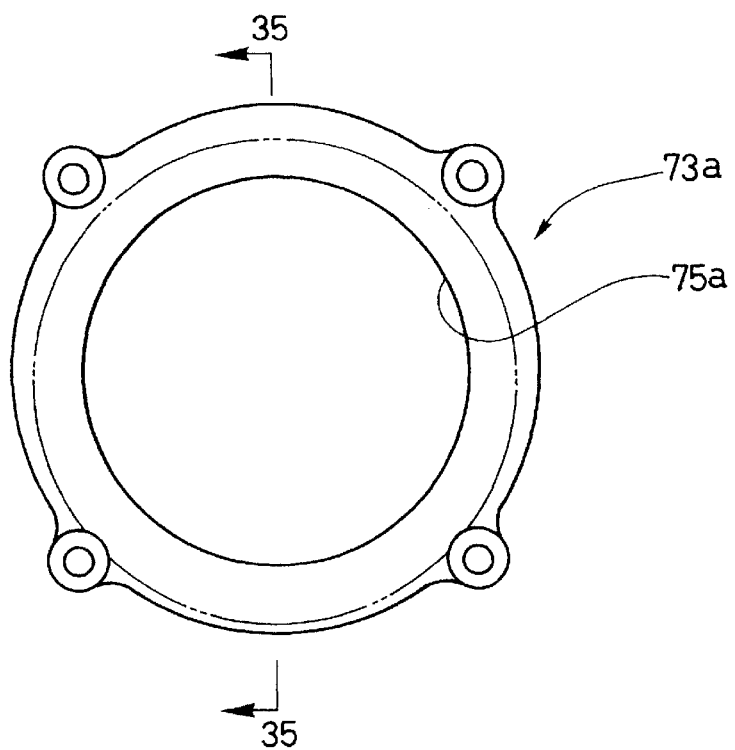
FIG. 34 is a front elevational view of the cover for the lid of the right gear indicator illustrated in FIGS. 2–5.
Figure 35:
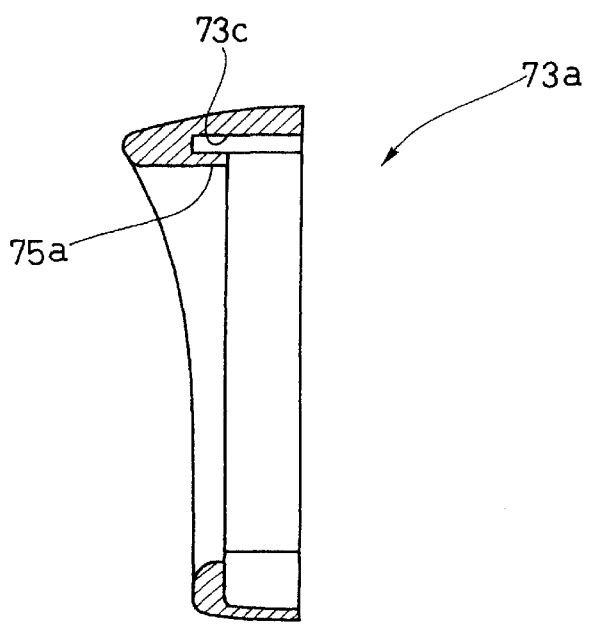
FIG. 35 is a cross-sectional view of the cover illustrated in FIG. 34 as seen along section line 35—35 of FIG. 34.
Figure 36:
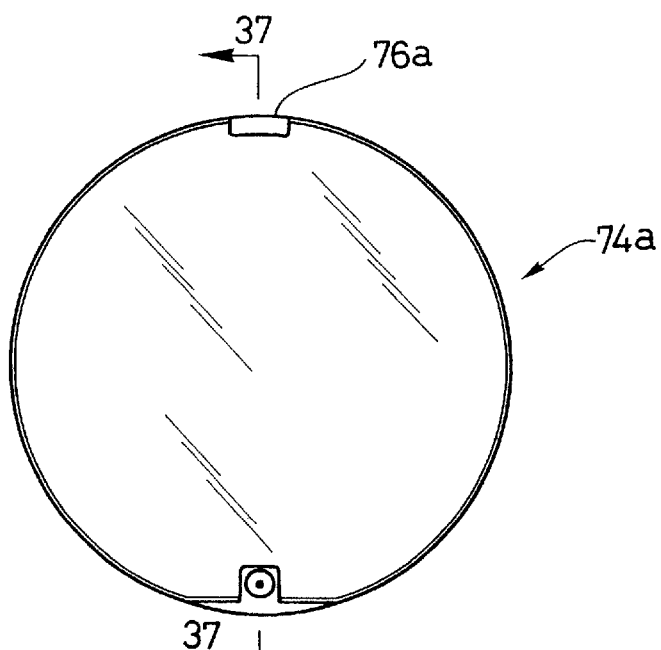
FIG. 36 is a front elevational view of the lens for the lid of the right gear indicator illustrated in FIGS. 2–5.
Figure 37:
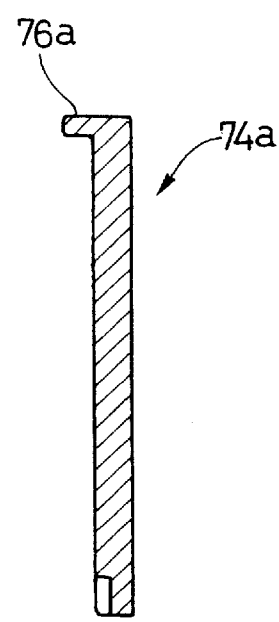
FIG. 37 is a cross-sectional view of the lens illustrated in FIG. 36 as seen along section line 37—37 of FIG. 36.

Lens 74a is sandwiched between cover 73a and housing 60a and overlies opening or window 75a. Preferably, lens 74a has a tab 76a that is received in a recess 73c in cover 73a so that lens 74a cannot rotate relative to mounting portion 61a as seen in FIG. 26. Tab 76a also ensures correct orientation of lens 74a relative to cover 73a.

Figure 38:
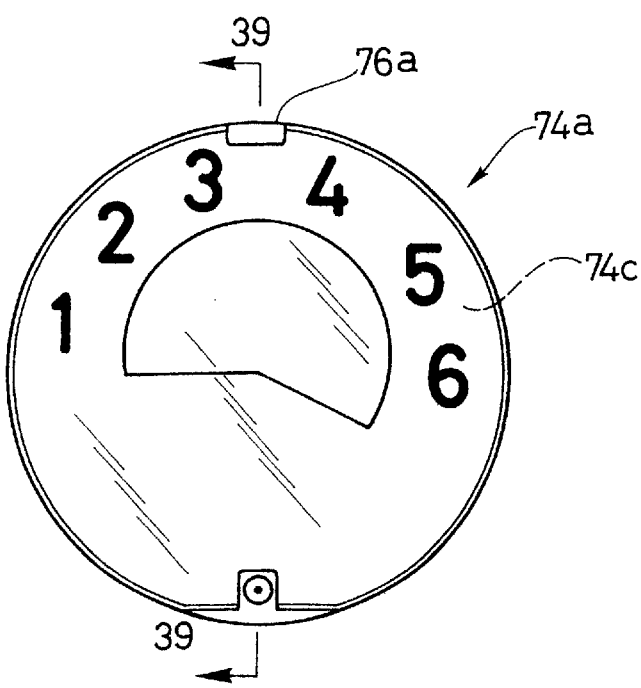
FIG. 38 is a front elevational view of the lens illustrated in FIGS. 36 and 37 with indicia added thereto.
Figure 39:
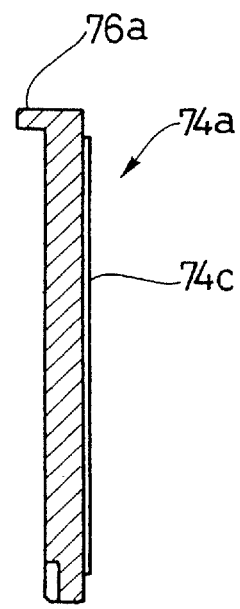
FIG. 39 is a cross-sectional view of the lens illustrated in FIG. 38 as seen along section line 39—39 of FIG. 38.
Figure 40:
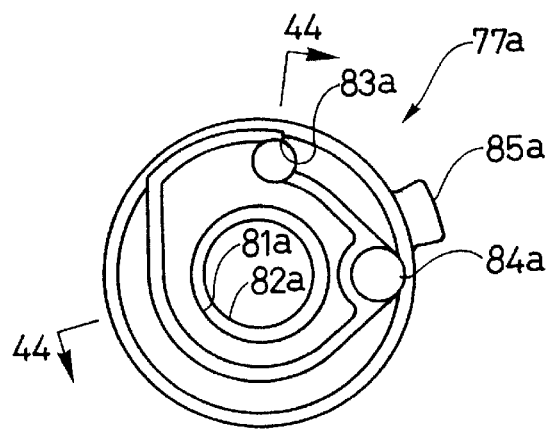
FIG. 40 is a front elevational view of the take-up element for the indicator mechanism o the right gear indicator illustrated in FIGS. 2–5.
Figure 41:
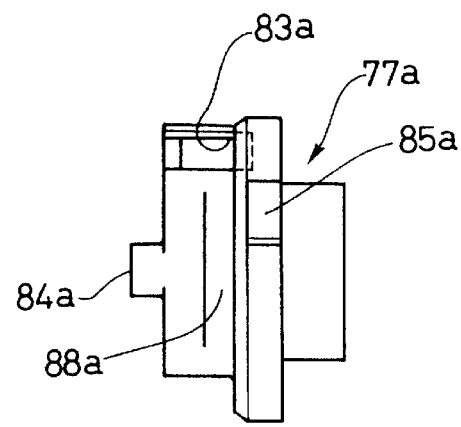
FIG. 41 is a right side elevational view of the take-up element illustrated in FIG. 40.
Figure 42:
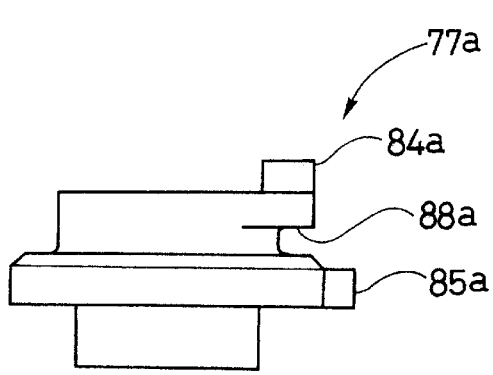
FIG. 42 is a bottom plan view of the take-up element illustrated in FIGS. 40 and 41.
Figure 43:
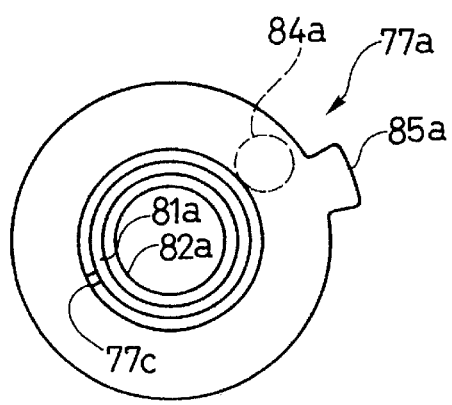
FIG. 43 is a rear elevational view of the take-up element illustrated in FIGS. 40–42.
Figure 44:
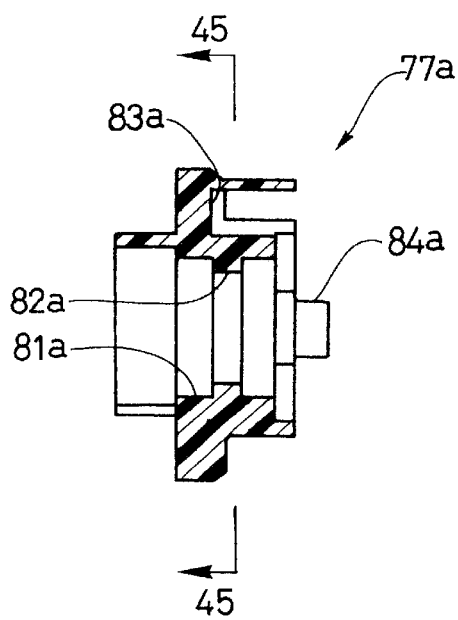
FIG. 44 is a cross-sectional view of the take-up element illustrated in FIGS. 40–43 as seen along section line 44—44 of FIG. 40.
Figure 45:
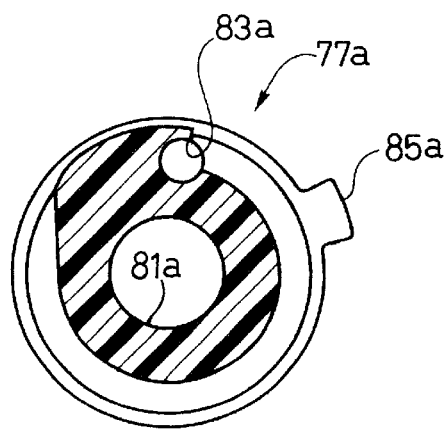
FIG. 45 is a cross-sectional view of the take-up element illustrated in FIGS. 40–44 as seen along section line 45—45 of FIG. 44.
Figure 46:
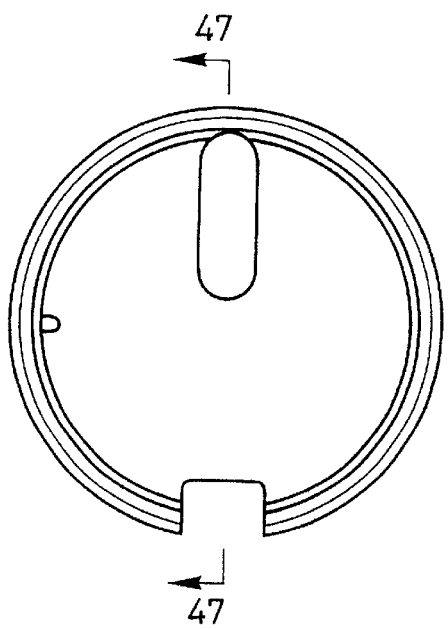
FIG. 46 is a front elevational view of the indicator plate for the internal mechanism of the right gear indicator illustrated in FIGS. 2–5.
Figure 47:
FIG. 47 is a cross-sectional view of the indicator plate illustrated in FIG. 46 as seen along section line 47—47 of FIG. 46.

As seen in FIGS. 38 and 39, lens 74a preferably has indicia printed thereon for indicating the gear positions. This indicia can be added directly to the inner surface of lens 74a, as shown, or to the external surface of lens 74a. This indicia can also be applied by a thin film 74c that is adhered to one of the inner or external surfaces of lens 74a.

Referring now to FIGS. 26 and 40–50, indicator mechanism 63a basically includes an internal take-up element 77a, a coil spring 78a and an indicator plate 79a. Internal take-up element 77a and indicator plate 79a can each be constructed of a lightweight plastic material. Of course, other types of suitable materials can also be utilized, such as lightweight metallic materials. Internal take-up element 77a is rotatably secured to pivot shaft 70a of housing 60a via a threaded fastener 80a.

Referring now to FIGS. 40–45, internal take-up element 77a has a center hole 81a with an annular flange 82a that cooperates with the step-shape of pivot shaft 70a such that internal take-up element 77a can freely rotate therebetween. Internal take-up element 77a is coupled to housing 60a by a threaded fastener 71c. The front face of internal take-up element 77a that faces towards the front opening 68a has a circular recess 83a for receiving the nipple 95a of indicator cable 22a therein. Since the recess 83a is formed on the front face of internal take-up element 77a, the nipple 95a of indicator cable 22a can be easily inserted therein without having to detach internal take-up element 77a from housing 60a.

The front face of internal take-up element 77a also has a circular protrusion 84a extending outwardly therefrom. This protrusion 84a is offset from the center axis A of internal take-up element 77a and is designed to engage indicator plate 79a for moving indicator plate 79a in response to movement of internal take-up element 77a, as explained below.

The pivotal or rotational movement of internal take-up element 77a is limited by a stop flange 85a that engages a pair of stops 86a and 87a formed on the inner surface of housing 60a. This stop flange 85a is located on the outer peripheral surface of internal take-up element 77a. The front face of internal take-up element 77a also has a cable retaining recess 88a that engages indicator cable 22a to hold the indicator cable 22a in place, and to prevent the nipple 95a from falling out of the recess 83a.

Referring again to FIG. 26, coil spring 78a is a biasing member that biases internal take-up element 77a in a counter-clockwise direction as viewed looking into the cavity of housing 60a through the front opening 68a. Thus, internal take-up element 77a is biased so that the stop flange 85a engages the stop surface 86a. Coil spring 78a has a coiled portion 90a that is located around pivot shaft 70a and a pair of free ends 91a and 92a with free end 91a located in a recess 60c of housing 60a, and free ends 92a located in a spring retaining slot 77c of internal take-up element 77a. Coil spring 78a is set to be pre-loaded to hold internal take-up element 77a in the position, as seen in FIG. 26.

Referring now to FIGS. 46–50, indicator plate 79a is generally a circular member that is rotatably mounted within the cavity of housing 60a about the center axis B of housing 60a. This center axis B of housing 60a is offset from the center axis A of pivot shaft 70a, as mentioned above. Indicator plate 79a includes indicia thereon for indicating the current gear position. More specifically, the indicia is a bar 79c that points to a number that is printed on lens 74a. In other words, indicator plate 79a rotates when the gear is shifted, such that indicator plate 79a rotates relative to lens 74a. Indicator plate 79a has a radially extending slot 93a that receives protrusion 84a of internal take-up element 77a. Accordingly, as internal take-up element 77a is rotated, protrusion 84a of internal take-up element 77a moves indicator plate 79a. Since the pivot axes of internal take-up element 77a and indicator plate 79a are not coincident with each other, indicator plate 79a does not rotate at the same speed as internal take-up element 77a.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A cable operated display device for a bicycle, comprising:
   a mounting portion adapted to be coupled to a portion of a bicycle;
   a housing coupled to said mounting portion, said housing having an interior cavity and an open front;
   an internal take-up element pivotally coupled within said housing about a first pivot axis, said internal take-up element having a cable attachment portion that is accessible through said open front of said housing without detaching said internal take-up element from said housing; and
   a lid releasably coupled to said housing to overlie said open front of said housing, said lid having a window to view movement of an indicator coupled to said internal take-up element.

2. A cable operated display device for a bicycle according to claim 1, wherein
   said internal take-up element has a front surface that faces said open front of said housing, said cable attachment portion being a recess formed on said front surface of said internal take-up element.

3. A cable operated display device for a bicycle according to claim 1, wherein
   said internal take-up element is biased in a rotational direction about said first pivot axis.

4. A cable operated display device for a bicycle according to claim 1, wherein
   said lid includes a molding portion and a transparent portion overlying an opening in said molding portion to form said window.

5. A cable operated display device for a bicycle according to claim 1, wherein
   said mounting portion includes a clamp.

6. A cable operated display device for a bicycle according to claim 5, wherein
   said clamp has a split ring section with a mounting bore and a fastener coupled to said split ring section to adjust the size of said mounting bore.

7. A cable operated display device for a bicycle according to claim 1, wherein
   said lid is detachably coupled to said housing by at least one fastener.

8. A cable operated display device for a bicycle according to claim 1, wherein
   said housing has a pivot shaft integrally formed therewith, said internal take-up element being pivotally supported on said pivot shaft.

9. A cable operated display device for a bicycle according to claim 8, wherein
   said internal take-up element is biased in a rotational direction about said first pivot axis by a coil spring mounted on said pivot shaft.

10. A cable operated display device for a bicycle according to claim 8, wherein
    said housing has a pair of stops integrally formed therewith that limit movement of said internal take-up element.

11. A cable operated display device for a bicycle according to claim 10, wherein
    said internal take-up element has a stop member that is located to selectively engage said stops of said housing.

12. A cable operated display device for a bicycle, comprising:
    a mounting portion adapted to be coupled to a portion of a bicycle;
    a housing coupled to said mounting portion, said housing having an interior cavity and an open front;
    an internal take-up element pivotally coupled within said housing about a first pivot axis, said internal take-up element having a cable attachment portion that is accessible through said open front of said housing without detaching said internal take-up element from said housing; and
    a lid releasably coupled to said housing to overlie said open front of said housing, said lid having a window to view movement of an indicator coupled to said internal take-up element,
    said indicator being pivotally coupled to said housing about a second pivot axis that is offset from said first pivot axis of said internal take-up element.

13. A cable operated display device for a bicycle according to claim 12, wherein
    said indicator has a slot with a pin of said internal take-up element located therein such that pivotal movement of said internal take-up element pivots said indicator.

14. A cable operated display device for a bicycle according to claim 13, wherein
    said lid includes a molding portion and a transparent portion overlying an opening in said molding portion to form said window.

* * * * *